United States Patent
Hulshof et al.

(10) Patent No.: US 7,064,501 B2
(45) Date of Patent: Jun. 20, 2006

(54) SAWTOOTH LINE CIRCUIT FOR A CATHODE RAY TUBE

(76) Inventors: Jozef Johannes Maria Hulshof, Prof. Holstlaan 6, 5656 AA Eindhoven (NL); Johannes Ludovicus Maria Verhees, Prof. Holstlaan 6, 5656 AA Eindhoven (NL)

(*) Notice: Subject to any disclaimer, the term of this patent is extended or adjusted under 35 U.S.C. 154(b) by 10 days.

(21) Appl. No.: 10/784,019

(22) Filed: Feb. 20, 2004

(65) Prior Publication Data
US 2004/0218105 A1 Nov. 4, 2004

(51) Int. Cl.
*H01J 29/70* (2006.01)

(52) U.S. Cl. .................... 315/399; 315/364

(58) Field of Classification Search ........... 315/399, 315/395, 370, 371, 364, 408; 348/767
See application file for complete search history.

(56) References Cited

U.S. PATENT DOCUMENTS

| | | | | |
|---|---|---|---|---|
| 3,906,305 A | | 9/1975 | Nillesen | |
| 4,234,824 A | * | 11/1980 | den Hollander | 315/371 |
| 5,194,784 A | * | 3/1993 | Tripod | 315/371 |
| 5,357,175 A | * | 10/1994 | Kamada et al. | 315/411 |
| 5,469,029 A | * | 11/1995 | Jackson et al. | 315/408 |
| 5,488,272 A | * | 1/1996 | Cotton | 315/408 |
| 5,717,296 A | * | 2/1998 | Onozawa et al. | 315/371 |
| 5,796,217 A | * | 8/1998 | Vacher | 315/408 |
| 5,981,952 A | * | 11/1999 | Kashiwagi | 250/382 |
| 6,091,212 A | * | 7/2000 | Park | 315/370 |
| 6,147,464 A | * | 11/2000 | Hsieh | 315/411 |
| 6,222,330 B1 | * | 4/2001 | Suzuki | 315/408 |

* cited by examiner

*Primary Examiner*—Wilson Lee
*Assistant Examiner*—Angela M Lie
(74) *Attorney, Agent, or Firm*—Kevin H. Fortin

(57) ABSTRACT

A circuit arrangement is described for generating a sawtooth current in a cathode ray tube deflection coil. The circuit arrangement has a first and a second multiresonant section. The sections are arranged in series. The cathode ray tube deflection coil is part of the first section. The second section has an inductor. Each section provides a trace period in which the sawtooth current is generated in the cathode ray tube deflection coil and a retrace period in which flyback of the sawtooth current is provided. The circuit arrangement further has a current control circuit coupled to the inductor for controlling the course of the sawtooth current.

8 Claims, 2 Drawing Sheets

SAWTOOTH LINE CIRCUIT FOR A CATHODE RAY TUBE

BACKGROUND

1. Field of Invention

The present invention relates to a circuit arrangement for generating a sawtooth current in a cathode ray tube deflection coil.

The present invention also relates to a display device, such as a monitor or a television, comprising a cathode ray tube, and to a television set comprising such a display device.

2. Description of Related Art

Such a circuit arrangement, display device, and television apparatus are known from U.S. Pat. No. 3,906,305. The known circuit arrangement includes a first and a second multiresonant section arranged in series. Each multiresonant section comprises a trace capacitor, a retrace capacitor, and a coil. One of the coils in the two or more sections is a line deflection coil of a cathode ray tube (CRT). The second section comprises an inductor in the form of a coil. Simultaneously, each section provides a common trace or first resonant period, in which the sawtooth current is generated in the CRT deflection coil and a similar current is generated in the coil-type inductor. The trace period is followed by a retrace period in each of the sections, in which the currents go back to their original value in a very short second resonant period of time. Semiconductor blocking means are connected in parallel to each of the sections and to the series arrangement of sections to control these trace and retrace periods. The circuit arrangement further has a driver modulator that is coupled in parallel to the trace capacitor of the second multiresonant section in order to provide the well known east-west raster correction of the CRT line deflection current. The inventor of the present invention has found that it is a disadvantage of the known circuit arrangement that it comprises many components which, apart from being relatively expensive and space consuming, also show a considerable power dissipation, which in general makes them more susceptible to breakdown.

Therefore it is an object of the present invention to provide a less dissipative, but more reliable and compact circuit arrangement comprising a smaller number of vulnerable components.

SUMMARY OF INVENTION

According to the invention, a circuit arrangement is for this purpose provided for generating a sawtooth current in a cathode ray tube deflection coil, the circuit arrangement comprising a first and a second multiresonant section arranged in series, the cathode ray tube deflection coil being comprised in the first section, and the second section comprising an inductor, each section providing a common trace period and a common retrace period to provide a flyback of said sawtooth current, and the circuit arrangement comprising a current control circuit coupled to the inductor for controlling the course of the sawtooth current. In this respect, the course of the sawtooth current is its instantaneous value as a function of time. It is an advantage of the circuit arrangement according to the present invention that, although the known arrangement has been scrutinized since its first development many years ago, the current control now devised makes the voluminous and expensive trace capacitor in the second multi-resonant section superfluous. However, also the second multiresonant section remains capable of acting properly in a kind of multi-resonant mode, both during the trace and during the retrace period.

In addition, the component count of the circuit arrangement according to the invention, which has never been essentially reduced since its original design, has now been reduced in a way which even allows complete line power stage integration on an integrated circuit. This brings one-chip television more easily within reach.

In an embodiment of the circuit arrangement according to the invention, the current control circuit is a current switching circuit which may be coupled between two supply voltages of the circuit arrangement.

It is an advantage of the circuit arrangement according to the invention that the current control circuit can be embodied by a simple current switching circuit. Such a switching circuit may be coupled to any of the power supply voltage terminals that are already present in present-day display or image devices, in practice the supply voltage or ground terminal, respectively. In that case the presence of additional power supply voltage rails is not required.

In a further embodiment of the circuit arrangement according to the invention, the circuit arrangement is arranged to effect a CRT east-west correction, in a simple embodiment by dynamically adjusting a current switching point in time marking a start of the trace period.

East-west correction to avoid barrel-shaped image distortion can then be effected by shifting the current switching point in time in order to influence the maximum and minimum value of the line current to the line deflection coil around the neck of a CRT in a display device, such as a monitor or television.

In an embodiment of the circuit arrangement according to the invention that is easy to implement, the inductor is a coil or a gyrator circuit.

BRIEF DESCRIPTION OF DRAWINGS

The circuit arrangement according to the invention will now be elucidated further together with its additional advantages, while reference is being made to the appended drawing. In the drawing.

DETAILED DESCRIPTION

Figure 1:
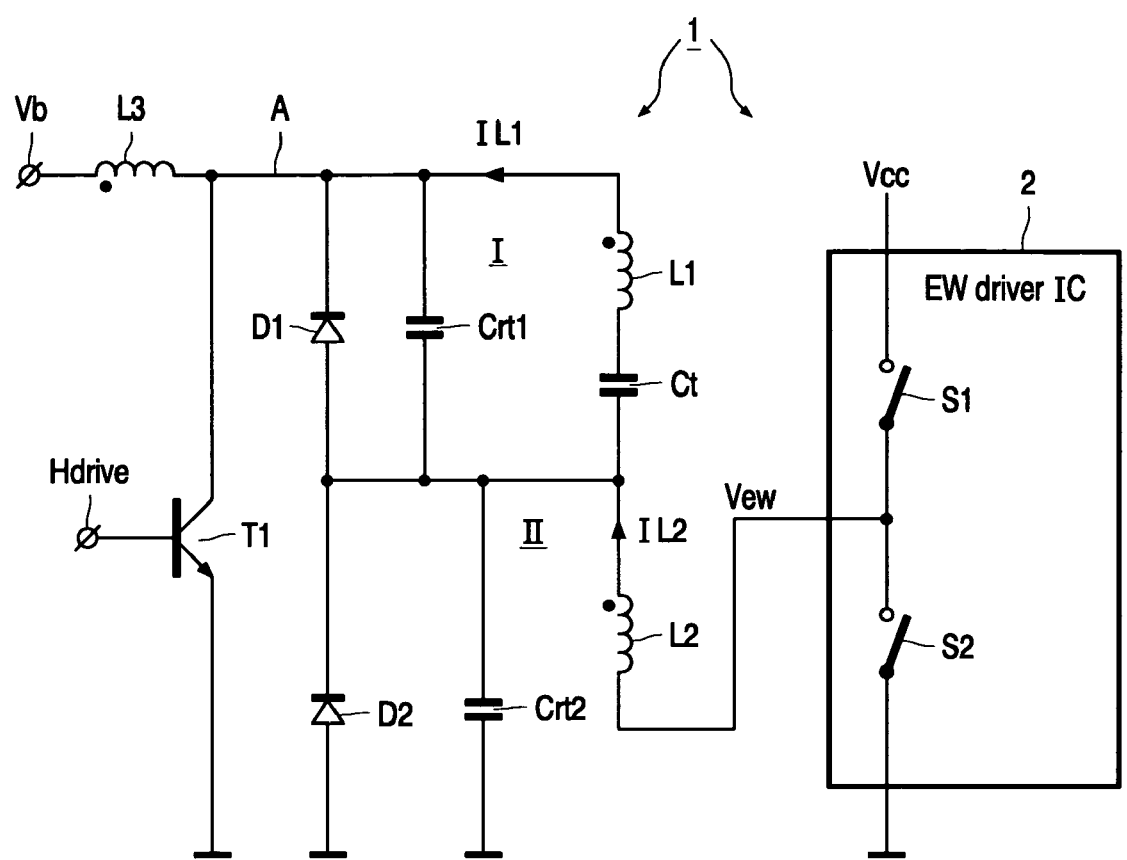
FIG. 1 shows a basic circuit diagram of an embodiment of a circuit arrangement according to the present invention.

FIG. 1 shows a basic circuit diagram of a circuit arrangement 1. Such a circuit arrangement 1 forms part of a circuit for generating a line current in a line deflection coil L1 in a display device such as, for example, a monitor or a television. The arrangement 1 also comprises a line transformer only partly shown in FIG. 1 and referenced L3. Further details, as regards additionally effecting image corrections or the deriving of an extremely high voltage (EHT) by the line transformer from a line voltage at terminal A for the acceleration anode of a color CRT, are outlined in U.S. Pat. No. 3,906,305, whose disclosure is included herein by reference.

The circuit arrangement 1 includes a first and a second multiresonant section I and II, respectively. Starting from a fixed DC voltage at supply terminal Vb, line transformer coil L3, and sections I and II are arranged in series and coupled to ground in the basic circuit diagram of FIG. 1. Section I comprises a series arrangement of deflection coil L1 and a trace capacitor Ct, which series arrangement is connected in parallel to a retrace capacitor Crt1 and a semiconductor transition, in particular a diode D1 with an indicated conductivity direction. Section II comprises a series arrangement of an inductor, which may be a gyrator circuit for simulating an inductance or a coil L2, and a current control circuit 2, which series arrangement of section II is connected in parallel to a retrace capacitor Crt2 and a semiconductor transition, in particular a diode D2 with an indicated conductivity direction, identical to that of diode D1. Apart from diodes D1 and D2, a controllable semiconductor means in the form of a drivable transistor T1 forms blocking means whose function will be explained below.

Figure 2:
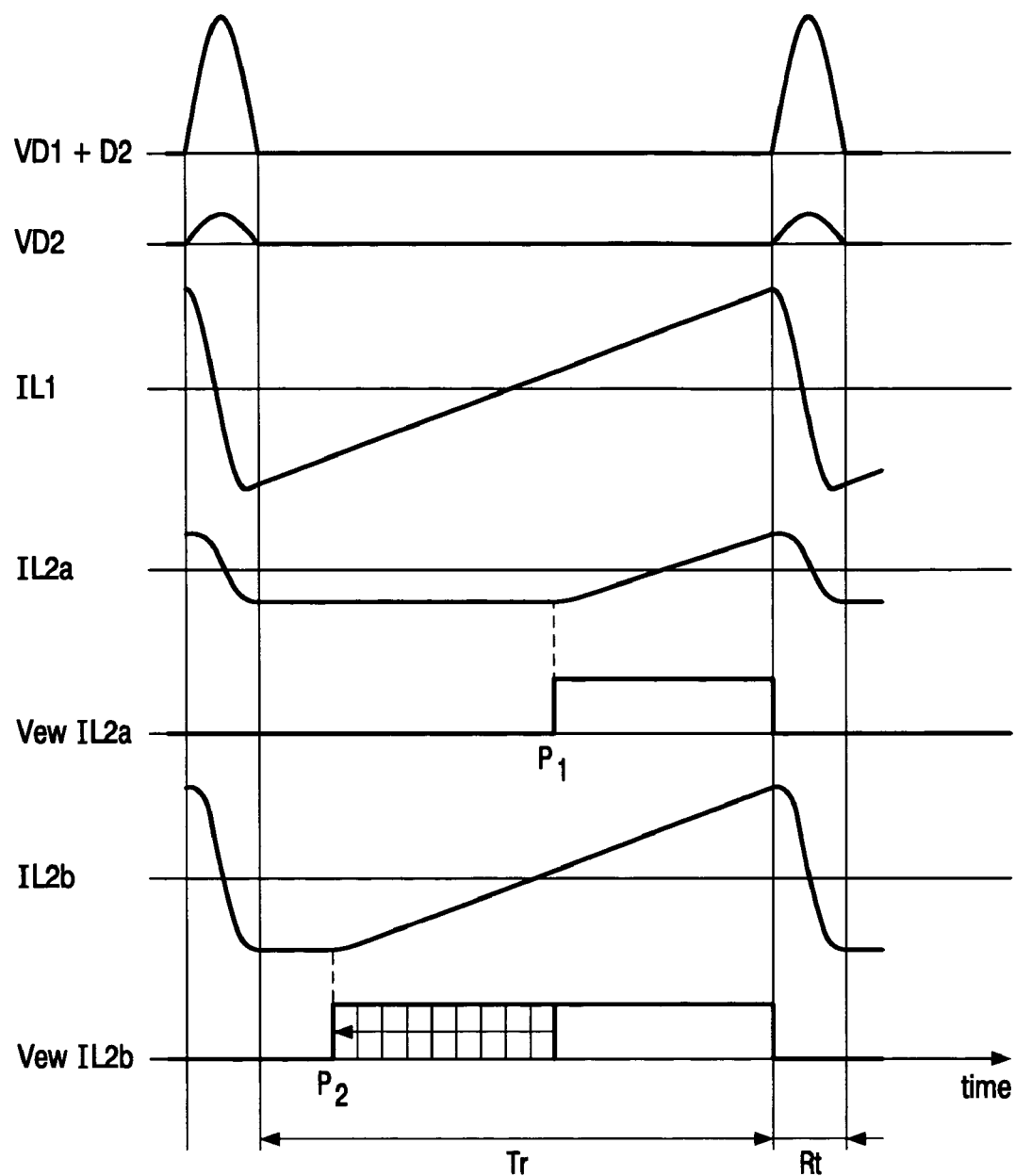
FIG. 2 shows various voltage and current, timing and waveform graphs arising in the circuit arrangement according to FIG. 1.

The operation of the circuit arrangement 1 of FIG. 1, which will be explained with the help of the voltage and current, timing and waveform graphs of FIG. 2, is as follows. Diodes D1 and D2 conduct during part of a so-called trace period Tr, which is common to both multiresonant sections I and II. Consequently a voltage across capacitor Ct in multiresonant section I is applied to line deflection coil L1 during a first resonance period. Since said voltage and the conductance L1 are constant, the differential ratio dIL1/dt will also be constant as a function of time so as to form a sawtooth part of the deflection current. This means that a line will be drawn on the CRT from left to right. Before current IL1 shown in FIG. 2 crosses zero approximately half-way of the trace time Tr, transistor T1 receives a drive signal Hdrive rendering T1 conducting and allowing current IL1 to become positive. Multiresonant section II advantageously lacks such a voluminous and expensive trace capacitor, so in a way the first resonance period thereof is simulated. That is, current IL2 through inductor L2 is controlled by current control circuit 2, which may contain two controllable current sources. In FIG. 2 these controllable current sources are simplified by the current switching circuit 2 then comprising controllable switches S1 and S2 coupled between two supply voltages, here Vcc and ground, of the circuit arrangement 1. During a part of the trace period Tr, wherein controllable switch S1 is closed and controllable switch S2 is open, dI12/dt is kept constant by an appropriate control of the current circuit 2. Due to the terminal Vb having a fixed dc voltage, any change in one of the sections I and II will be compensated for by a similar negative change in the other one of the sections I and II. If current Il1 is larger than current Il2, a surplus current will flow through transistor T1 and diode D2, while conversely if Il2>Il1 a surplus current will flow through T1 and D1. So any change in controlled current Il2 will lead to a subsequent change of current in Il1. A CRT east-west correction can now be adjusted dynamically by influencing current switching points in time marked P1 and P2. In addition the current control circuit 2 lacks a large dissipative control transistor including a heat sink, so that a higher degree of integration becomes possible. The switching points P1, P2 mark the adjustable starts of the trace period part after which dI1/dt and dIl2/dt are both constant. This is schematically shown in FIG. 2 by the vertical dashed lines, while the possibility of adjustments of the switching points is indicated by an arrow to the left. The more the switching point P1 or P2 is shifted to the left, the shorter the length of a line drawn on the CRT will be, thus allowing for an appropriate east-west image or barrel correction. This is because the shifting to the left of the switching point P1, P2 in FIG. 2 increases the amplitude of the current Il2 in section II, as a result of which the current amplitude of Il1 decreases, resulting in the shorter line length.

Now during a so called flyback or retrace period Rt—common to both sections I and II—wherein S1 and S2 are timed such that S2 closes and S1 opens, T1 is controlled to open, and consequently retrace capacitors Crt1 and Crt2 are supplied with respective inductive currents from L1 and L2, respectively, during a second resonance period. This leads to diode voltages across diodes D1 and D2 indicated as VD1 and VD1+D2. In practice the voltage at terminal A may approximate a desired value of approximately 1200 V if a stable EHT voltage is to be derived therefrom by the line transformer. The time scale of the resonance during period Rt is much shorter than that of Tr, because the capacitor value of capacitor Ct is much larger than the capacitor value of capacitor Crt1. At the instant when the diode voltages become zero again, diodes D1 and D2 simultaneously become conducting, thus marking the beginning of a next trace period Tr.

It is noted, that in this document the verb 'comprise' and its conjugations do not exclude the presence of other elements or steps than those listed, that the word 'a' or 'an' preceding an element does not exclude the presence of a plurality of such elements, and that any reference signs do not limit the scope of the claims. Furthermore, the scope of the invention is not limited to the embodiments, and the invention lies in each and every novel feature or combination of features described above.

The invention claimed is:

1. A circuit arrangement (1) for generating a sawtooth current (Il1, Il2) in a cathode ray tube deflection coil (L1), the circuit arrangement (1) comprising a first (I) and second (II) multiresonant section arranged in series, the cathode ray tube deflection coil (L1) in series with a trace capacitor (Ct) being comprised in the first section (I), and the second section (II) comprising an inductor (L2), each section (I, II) providing a common truce period (Tr) and a common retrace period (Rt) to provide a flyback of said sawtooth current (Il1, Il2), and the circuit arrangement (1) comprising a current control circuit (2) being directly coupled to the inductor (L2), and being without a second trace capacitor coupled from said inductor (L2) to ground, the current control circuit controlling the course of the sawtooth current (Il1, Il2).

2. The circuit arrangement (1) according to claim 1, wherein the current control circuit is a current switching circuit (S1, S2).

3. The circuit arrangement according to claim 2, wherein the current control circuit is coupled between two supply voltages (Vcc, GND) of the circuit arrangement (1).

4. The circuit arrangement (1) according to claim 1, wherein the current control circuit (2) is arranged to effect a cathode ray tube east-west correction.

5. The circuit arrangement (1) according to claim 4, wherein the cathode ray tube east-west correction is effected by dynamically adjusting a current switching point (P1, P2) in time marking a start of the trace period (Tr).

6. The circuit arrangement (10) according to claim 1, wherein the inductor (L2) is a coil or gyrator circuit.

7. A display device comprising a cathode ray tube, the display device comprising a circuit arrangement (1) for generating a sawtooth current (Il1, Il2) in a cathode ray tube deflection coil (L1) coupled to a cathode ray tube, the circuit arrangement (1) comprising a first (I) and a second (II) multiresonant section arranged in series, the cathode ray tube deflection coil (L1) connected in series with a trace capacitor (Cr) being comprised in the first section (1), and the second section (II) comprising an inductor (L2), each section (I, II) providing a common trace period (Tr) and a common retrace period (Rt) to provide a flyback of said sawtooth current (Il1, Il2), and the circuit arrangement (1) comprising a current control circuit (2) being directly coupled to the inductor (L2) without another trace capacitor connected between said inductor (L2) and ground, the control circuit controlling the course of the sawtooth current (Il1, Il2).

8. A television set comprising a display device according to claim 7.

* * * * *